Oct. 26, 1948. C. D. RYDER 2,452,528
TRUCK REFLECTOR
Filed Aug. 20, 1945
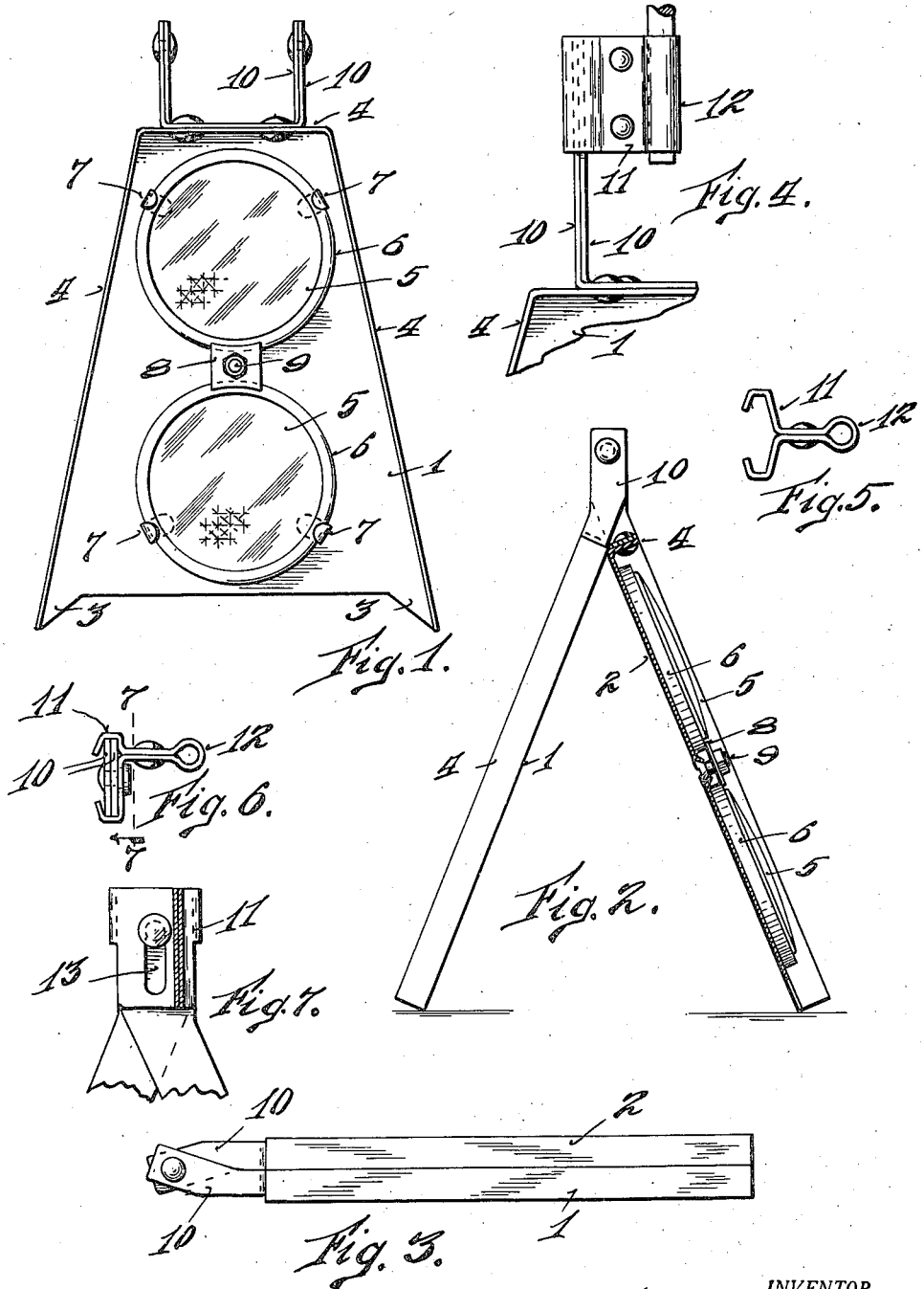
INVENTOR.
Charles D. Ryder
BY
Oliver B. Kaiser
Atty.

Patented Oct. 26, 1948

2,452,528

UNITED STATES PATENT OFFICE 2,452,528

TRUCK REFLECTOR

Charles D. Ryder, Covington, Ky., assignor to The Grote Manufacturing Company, Bellevue, Ky., a corporation of Kentucky Application August 20, 1945, Serial No. 611,457

2 Claims. (Cl. 248—176)

This invention relates to a highway signaling device and particularly to a portable signal adapted to be stationed on the highway or thoroughfare and the like, in proximity to an obstruction thereon, as a warning to approaching vehicular traffic of the obstruction.

In some instances it is necessary to park a motor vehicle, as a truck upon the highway, particularly where the sides along the highway are not loadbearing or offer sufficient space to permit the vehicle to be moved therefrom, clear of the highway or in the event of wheel trouble preventing, it becomes an obstruction or hazard to other vehicle travel, thereby necessitating the display of some form of signal or give warning to approaching vehicles for safety and precautionary measures.

It is an object of the invention to provide an efficient and portable signal device, adapted to be stationed on the highway capable of reflecting and or refracting light rays generated as by the lights of approaching vehicles, back to the source to warn the occupants of those vehicles of the presence of an obstruction on the road.

Another object is to provide a light reflecting signal device of collapsible or foldable knockdown structure, to compact the same for convenient storage as in a pocket or the like in the vehicle and which can be easily and quickly erected to a substantial posture of trestle-like characteristic for setting upon the highway and exposing light reflecting lenses from relative alternate sides of a pair of obliquely disposed panels, hingedly connected at one end to be erected in trestle form and which serve to encase and protect the light reflecting lenses in the knock-down or collapsed condition of the signal device.

Various other features and advantages of the invention will be more fully set forth in the following description of the accompanying drawings, forming a part hereof and depicting a preferred embodiment, in which:

Figure 1 is a plan view of one of the lens carrying panels and which forms a side of a trestle-like stand in an erected position of the device.

Figure 2 is a side elevation of the signal device in its erected position as a trestle-form stand with one of the panel sides thereof in central vertical section.

Figure 3 is a side elevation of the device in its collapsed position.

Figure 4 is a side elevation of a removable clip as applied for signal device in its erected or set-up position and which also serves as bracket support for the staff of a signal flag.

Figure 5 is an end elevation of the clip.

Figure 6 is an end view of a modified form of clip, non-removable from the panel hinging brackets.

Figure 7 is a section on line 7, 7, Figure 6.

Referring to the drawings, the invention in detail, comprises, a pair of sheet metal panels 1 and 2, hingedly connected together at one end, to adapting the same to be compactly folded, in parallelism, one upon another, for a closed position and for an erected position to be relatively angularly disposed and provide a trestle form of stand. The panels preferably are of outline configuration for increased stability in their erected position, as a stand, therefore are of greater width dimension at one end, for the base of the stand, narrowing toward the top end, at which they are hingedly connected.

The lower or free end of the panel, is cut inward to provide a pair of legs or studs 3, 3, one for each of its opposite corners, for a pricking contact with the surface of the highway or ground upon which the stand rests.

The panels are of duplicate dimension and construction so that the detail description thereof, will be confined to the singular. The opposite longitudinal edges and hinged end of the panel is bordered by a lateral flange 4, to give rigidity to the panel and pan shape for recessing and encasing a pair of reflector lenses 5, 5, mounted upon the flanged side of the panel, thus upon the outer side in the erected position of the panels, as a stand, and encased within the panels in the collapsed position of the stand or unit. A pair of lenses are provided, although their number is optional, and preferably are in an aligned arrangement, centrally and longitudinally of the panels, for a balanced condition.

The lenses are of conventional construction, preferably of colored, as red, moldable plastic material, which permits of greater sharpness for the prismatic formation on the back or reverse side of the lens for superior light reflecting effects. The lens has a smooth and curved face side and the rear side of suitable prismatic formation for reflecting and or refracting light rays, as generated by the head lights of an approaching vehicle, back to the light source for signalling and warning the occupants of such vehicle of the presence of an obstruction on the highway or road.

The rear side of the lens is covered or enclosed by a casing 6, having a bezel form of rim in engagement about the periphery of the lens. The lenses are mounted upon the panel, each by a pair of tangs 7, 7, stamped out and bent up from the body of the panel, clipping over the rim of the casing 6, and the pair of lenses jointly, at an adjoining portion are clamped by a clamp plate 8, having its opposite ends respectively overlappingly engaging the rims of the casings and fixed to the panel by a nut screw 9, engaged through the panel.

The panels are hingedly connected at a relative end, by a pair of hinge brackets 10, 10, each of U-form, with the limbs thereof in pairs hingedly connected by a rivet and the cross bar portion thereof riveted to the cross flange of a respective panel, as at the top end of the panel when in its erected position. Thus each hinge bracket is coextensive of its panel to which it is secured and relatively angular thereto, permitting the panels in a collapsed or folded position of the stand or unit to be brought into parallelism, one upon another with their flanges in edge to edge contact for encasing the lenses on both panels, adequately protecting the lenses and compactly folding the unit for storage.

The form of hinge brackets employed permits the panels, when swung to a fully open position as a trestle stand to be brought into contact with each other at their upper end, with the limbs of the hinge brackets extending centrally therefrom and perpendicular to the ground plane upon which the stand rests, adapting the same to be locked together to securely maintain the stand or unit in its erected position.

A clasp form of clamp 11, is preferably employed for clipping a companion pair of limbs of the hinge bracket together, formed from a metal strip, to clasp over a pair of limbs of the hinge with the body portion of the clamp extending laterally from the hinge limbs and terminating with a socket 12, for receiving and sustaining the end of a staff of a signal flag, for extension upwardly from the stand.

In Figures 4 and 5, the clamp is shown as separable or removable from a pair of hinge bracket limbs, while in Figures 6 and 7, it is slidable and non-removably mounted to a pair of hinge bracket limbs. The body of the clamp is provided with an elongated slot 13, which is traversed by the pin hingedly connecting a pair of limbs of the hinge brackets and therefore slidable thereon for clamping the limbs against movement in one instance and alternately to release the same.

Having described my invention, I claim:

1. A road signal of the nature disclosed, comprising: a pair of duplicate sheet metal panels, each having a flange extending laterally from a face side providing a rim for the opposite side and top ends of the panel, and brackets of U-shape respectively fixed to the flange at the top end of a panel with the limbs of the brackets pivotally connected in adjoining pairs hingedly joining the panels at their top ends to swing the same to a juxta-position with their rim flanges in edge-wise registry providing an enclosure for light reflecting fixtures mounted upon the inner face sides of the panels and alternately to erect the panels in a relatively diverging position to station the same upright as a unit upon a surface and expose the light reflecting fixtures respectively from opposite sides of the unit.

2. A road signal of the nature disclosed comprising: a pair of duplicate sheet metal panels, each having a flange extending laterally from a face side providing a rim for the opposite side and top end of the panel, brackets each of U-form respectively fixed to the flange at the top end of a panel with the limbs of the brackets pivotally connected in adjoining pairs, and each limb having a terminal portion extending from a relative panel at an angle to the plane thereof adapting the terminals of each pair of pivotally connected limbs to be brought into registry hingedly joining the panels at their top ends to swing the same to a juxta-position with their rim flanges in edge-wise registry providing an enclosure for light reflecting fixtures mounted upon the inner face sides of the panels and alternately to erect the panels in a relatively diverging position to station the same upright as a unit upon a surface and expose the light reflecting fixtures respectively from opposite sides of the unit, and a clasp movably mounted upon one of a pair of adjoining limbs of the brackets for locking the same together when in registry.

CHARLES D. RYDER.

REFERENCES CITED

The following references are of record in the file of this patent:

UNITED STATES PATENTS

| Number | Name | Date |
|---|---|---|
| 2,062,094 | Kip | Nov. 24, 1936 |
| 2,090,157 | Smith | Aug. 17, 1937 |
| 2,235,284 | Carver | Mar. 18, 1941 |
| 2,256,014 | Carver | Sept. 16, 1941 |

FOREIGN PATENTS

| Number | Country | Date |
|---|---|---|
| 57,743 | Sweden | Oct. 28, 1924 |